MAGNETIC NOT OR CIRCUIT

Filed Dec. 24, 1957

INVENTORS
ERICH BLOCH
ROBERT C. PAULSEN
BY
William V. Schelberg
AGENT

United States Patent Office 2,889,543
Patented June 2, 1959

2,889,543

MAGNETIC NOT OR CIRCUIT

Erich Bloch, Poughkeepsie, N.Y., and Robert C. Paulsen, Boonton, N.J., assignors to International Business Machines Corporation, New York, N.Y., a corporation of New York Application December 24, 1957, Serial No. 705,063

8 Claims. (Cl. 340—174)

The present invention relates to pulse transfer and switching circuits and more particularly to a magnetic core "Not Or" circuit which does not require the use of diodes.

Due to the economy and inherent reliability of magnetic logical components, their use is highly desirable in data handling systems, however, in many instances diodes are required in circuits interconnecting such magnetic core elements which consume appreciable power and necessitate employment of cores of the metallic tape variety. A number of logical components have been devised which avoid the need for diodes in the coupling circuits as disclosed and claimed in the copending applications, Serial Numbers 528,594 and 629,631, filed August 16, 1955, and December 20, 1956, respectively, in behalf of Louis A. Russell, which applications are assigned to the same assignee as the present invention and with which it is adapted to operate.

Accordingly, it is a prime object of this invention to provide a novel magnetic logical switching circuit operable with pulse transfer circuits that do not require the use of diodes.

A more specific object of this invention is to provide a magnetic core switching circuit capable of performing the function of "Not Or" which does not require the use of diodes.

Still another object of this invention is to provide a logical circuit adapted to receive input pulses over a selectable time interval and to produce an output indication at a selectable time.

Other objects will be pointed out in the following description and claims and illustrated in the accompanying drawings which disclose by way of example the principle of the invention and a contemplated mode of applying the principle.

Figure 3:
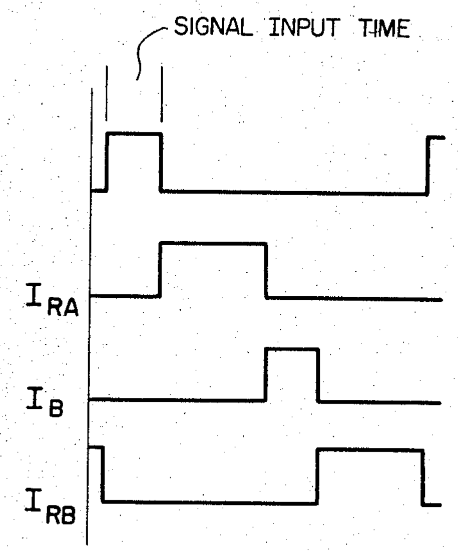
Figure 2:
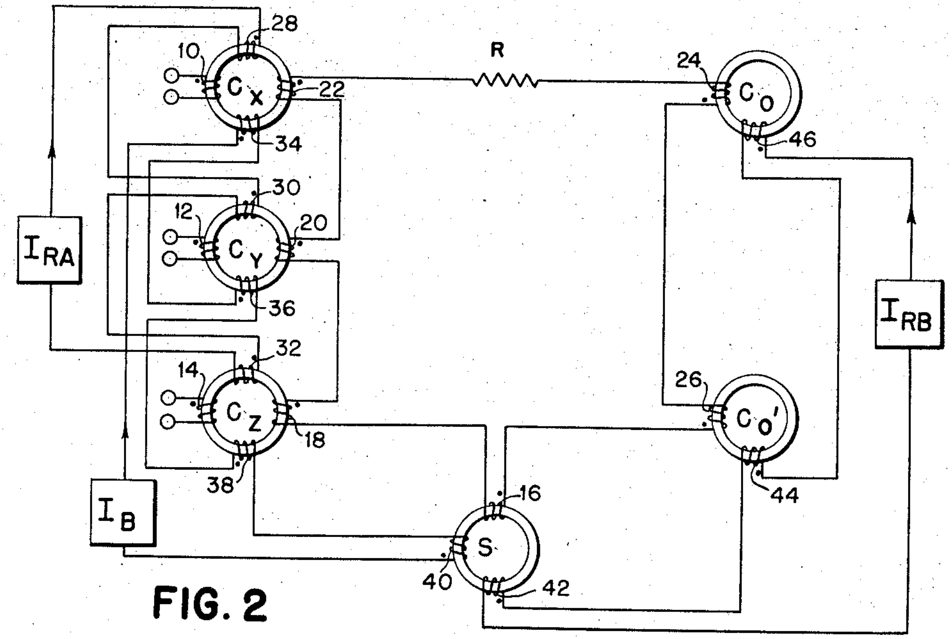
Fig. 2 is a circuit diagram of a magnetic core "Not Or" circuit according to the invention.

Fig. 3 illustrated the relative timing of current pulses which are required for operating the circuit of Fig. 2.

In accordance with the foregoing objects, a "Not Or" circuit may be constructed having a plurality of input coupling cores and a single storage core. An individual input winding is provided linking each of their respective input cores, wherein each winding is capable of switching the respective core linked from one limiting magnetic state to another, when energized. An individual output winding is provided linking each of their respective input cores and are serially connected with a control winding on the storage core. For any combination of inputs, the storage core is allowed to switch from a first limiting state of residual magnetization to a second limiting state. At output time, the storage core is pulsed to the second limiting state. Thus, whenever an input is present, in any combination, no output is provided. If, however, there is an absence of inputs to the circuit, the storage core will remain in the first limiting state and when later pulsed to the second limiting state will provide an output indication.

Figure 1:
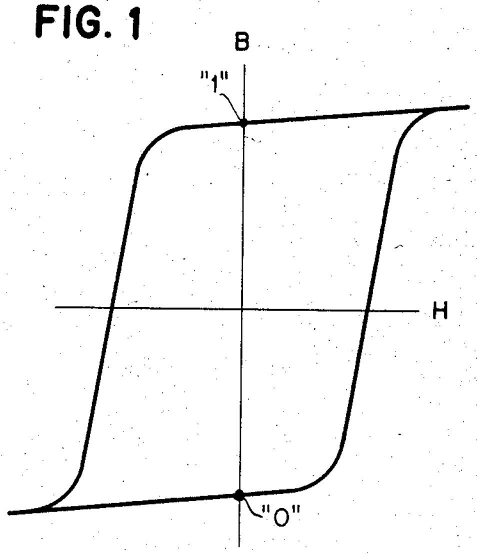
Fig. 1 is a representation of the hysteresis characteristic obtained for material of the type employed.

Referring to Fig. 1, the curve illustrated comprises a plot of flux density (B) versus applied field (H) for a magnetic core having a substantially rectangular hysteresis characteristic. The opposite remanence states are conventionally employed for representing binary information and are arbitrarily designated as "0" and "1" in the figure. With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in reverse sense to the same or another winding. Such a pulse is hereinafter referred to as a "read" pulse. Should a "1" have been stored, a large flux change occurs with the shift from the "1" to "0" conditions with a corresponding voltage magnitude developed on an output winding. On the other hand, should a "0" have been stored, little flux change occurs and negligible signal is developed on the output winding.

In accordance with the convention employed heretofore in the above mentioned applications, a dot marking is shown adjacent one winding terminal of each of the windings shown in Fig. 2, indicating its winding direction in that a positive pulse directed into the dotted end tends to apply a negative field or store a "0," termed a read pulse, while a positive pulse into the unmarked end tends to store a "1," termed a write pulse.

The arrangement disclosed employs input and output coupling magnetic cores intermediate to so called storage magnetic cores which store certain logical information and this arrangement is adapted to be interconnected with further similar type circuitry through such coupling cores. These coupling cores may be fabricated of ferrite materials like the storage cores, however, it is not essential that they exhibit the rectangular hysteresis characteristic required of the storage or memory cores as these devices function as variable impedance elements in controlling the transfer of information pulses, as will be more evident from the following descriptions.

Referring to the Fig. 2, such interconnecting coupling cores are illustrated in the circuit and labeled *Cx*, *Cy*, *Cz*, *Co* and *Co'* for clarity. An input winding 10 is provided in the core *Cx*, an input winding 12 on the core *Cy* and an input winding 14 on the core *Cz* which windings are adapted to be energized with a positive pulse representing a one or a zero. A core $S_1$ is provided which functions to store input information and is adapted to deliver this information in inverted form to other logical stages through the coupling cores *Co* and *Co'*. The core $S_1$ is provided with a winding 16 interconnected with an output winding 18 on the core *Cz*, an output winding 20 on the core *Cy*, an output winding 22 on the core *Cx*, an input winding 24 on the core *Co* through a resistor R and an input winding 26 on the core *Co'*.

The "Not Or" function is provided by the storage core $S_1$ and information pulses transferred to this core through the input coupling cores *Cx*, *Cz* and *Cy* which are in turn transferred from the core $S_1$ in inverted form through the coupling cores *Co* and *Co'* to following logical stages. The coupling cores *Cx*, *Cy* and *Cz* are energized from a clock pulse source $I_{RA}$, while the cores $S_1$, *Co* and *Co'* are energized by a clock pulse source $I_{RB}$ with the cores *Cx*, *Cy*, *Cz* and S further energized by a clock pulse source $I_B$. A winding 28 in the core *Cx*, a winding 30 on the core *Cy* and a winding 32 on the core *Cz* are series connected with the source $I_{RA}$; a winding 34 on the core $Cx$, a winding 36 on the core $Cy$, a winding 38 on the core $Cz$ and a winding 40 on the core S are series connected with the source $I_B$; and a winding 42 on the core S, a winding 44 on the core $Co'$ and a winding 46 on the core $Co$ are series connected with the source $I_{RB}$.

The sequence of pulses provided by the several clock pulse sources described above is indicated in Fig. 3 and may be observed as being in conformity with that shown in application Serial No. 598,651, aforementioned with which this "Not Or" circuit is adapted to function.

To explain the operation of the component, consider first that all the cores shown are at the lower remanence condition "0" shown in Fig. 1. In the event an input, which is a positive pulse directed into the undotted end of an input winding, the time of appearance of which is as indicated in the Fig. 3, is directed into any one of the windings 10, 12, or 14 on the cores $Cx$, $Cy$ or $Cz$, respectively, the core to which it is directed is switched from the "0" toward the "1" state to cause a flux change which induces a voltage in the associated output winding of the switched input core. Assume the input is directed into the winding 10 on the core $Cx$. The induced voltage then appears in the output winding 22 with the undotted end positive causing a counter-clockwise current in the loop which is directed into the unmarked terminal of the winding 16 on the core S and switches the core S from the "0" to the "1" state. The current into the marked end of the winding 20, 18, 26 and 24 is in such a direction as to store a "0" in each of the cores $Cy$, $Cz$, $Co'$ and $Co$, respectively, so that each of these cores remain in the "0" state. At the conclusion of the input pulse, cores $Cx$ and S are in the "1" state and a subsequent clock pulse $I_{RA}$ occurs which directs a read pulse into each of the windings 28, 30 and 32 on the cores $Cx$, $Cy$ and $Cz$, respectively, resetting the core $Cx$ to "0." The core Cx in switching from "1" *to* "0" induces a voltage in the output winding 22 with the dotted end positive causing a clockwise current in the loop which tends to write the cores $Co$, $Co'$, $Cz$ and $Cy$, while tending to read the core *S*. The $I_{RA}$ clock pulseis such a sto switch the core $Cx$ at a slow enough rate that this clockwise current is insufficient to cause switching in any one of the cores to an opposite state. After the core $Cx$ has been fully reset to the "0" state by the $I_{RA}$ clock pulse, the $I_B$ clock pulse occurs to direct a signal into the winding 34, 36, 38 and 40 on the cores $Cx$, $Cy$, $Cz$ and S, respectively, which tends to read the cores $Cx$, $Cy$ and $Cz$ while tending to write the core S. Since the core S is already in the "1" state and the cores $Cx$, $Cy$ and $Cz$ are already in the "0" state, no change takes place. At the termination of the $I_B$ clock pulse, the $I_{RB}$ clock pulse occurs to direct a read pulse into each of the windings 42, 44 and 46 on the cores S, $Co'$ and $Co$. The core S is switched from the "1" toward the "0" state to induce a voltage in the winding 16 with the dotted end positive causing a counter-clockwise current in the loop which tends to read each of the cores $Co'$, $Co$, $Cx$, $Cy$ and $Cz$. Since all the cores were previously in the "0" state, no change takes place, leaving all the cores in the circuit in the "0" state at the terminal of the $I_{RB}$ clock pulse readying the circuit for the next cycle of operation. It is understood from the operation of the circuit described, if, during any cycle of operation, the storage core S is switched to the "1" state, an output will not be available.

In the next cycle of operation, assume an input were directed into any two of the input windings, say windings 10 and 12 on the cores $Cx$ and $Cy$, respectively. The cores $Cx$ and $Cy$ each switch from the "0" toward the "1" state to induce a voltage in the output windings 22 and 20, respectively, with their undotted end positive. The induced voltage causes a counter-clockwise current in the loop which tends to write the core S and read the cores $Cz$, $Co'$ and $Co$. Each of the cores $Cz$, $Co'$ and $Co$ are already in the "0" state and are therefore unaffected. The core S then starts switching from the "0" toward the "1" state, however, since there is now available twice the amount of volt-time product necessary to fully switch the core S to the "1" state as there was in the previously described operation, the core S switches faster and once switched the cores $Cx$ and $Cy$ are loaded heavily to prevent any further flux change in either of these cores. At the termination of the input pulse, the core S is in the "1" state, while the cores $Cx$ and $Cy$ are in a partially switched remanence state. The $I_{RA}$ clock pulse source now directs a read pulse into each of the windings 28, 30 and 34 on the cores $Cx$, $Cy$ and $Cz$, respectively, which resets the cores $Cx$ and $Cy$ to the "0" state causing an induced voltage in the output windings 22 and 20, respectively, with the dotted end positive. The algebraic sum of the induced voltage is effectively equal to one of the cores being reset from the "1" to the "0" state since, as previously described, the cores $Cx$ and $Cy$ were not fully switched during input time and therefore, the resulting clockwise current is approximately the same as in the previous operation when only one input was present. Upon termination of the $I_{RA}$ clock pulse the cores Cx and Cy are left in the "0" state while the core S is left in the "1" state. Subsequent application of the $I_B$ and $I_{RB}$ clock pulses is the same as the previous operation when only one input was present to allow no output and to return the core S to the "0" state readying the circuit for the next cycle of operation.

From the description of operation of the first two cycles wherein only one input and then two inputs were present, it is obvious that if all three inputs are present in the third cycle of operation, the cores $Cx$, $Cy$ and $Cz$, will be partially switched toward the "1" state due to the faster rate at which the core S is switched to the "1" state, providing an increased load to the input cores. Since the core S is switched to the "1" state by the inputs, subsequent application of the $I_{RA}$, $I_B$ and $I_{RB}$ clock pulses will provide no output from the circuit and return all cores to the "0" state readying the circuit for the next cycle of operation.

In the fourth cycle of operation, assume an absence of input into the circuit. The $I_{RA}$ clock pulse source then directs a read signal into the windings 28, 30 and 32 on the cores $Cx$, $Cy$ and $Cz$, respectively, which signal has no effect since each of the cores are already in the "0" state. Upon termination of the $I_{RA}$ clock pulse, the $I_B$ clock pulse source directs a signal into the windings 34, 36, 38 and 40 on the cores $Cx$, $Cy$, $Cz$ and S, respectively, which tends to read the cores $Cx$, $Cy$ and $Cz$ while tending to write the core S. The core S is then switched from the "0" toward the "1" state causing an induced voltage in the winding 16 with the undotted end positive. This induced voltage in turn causes a clockwise current in the loop tending to write each of the cores $Cz$, $Cy$, $Cx$, Co and $Co'$. Since the cores $Cx$, $Cy$ and $Cz$ are held in the "0" state by virtue of the $I_B$ drive in their windings 32, 30, and 28, respectively, they are uneffected, while the cores $Co$, and $Co'$ are switched from the "0" toward the "1" state engendering a signal output to further logical circuits which may be inductively coupled to the cores $Co$ and $Co'$. Upon termination of the $I_B$ clock pulse, the $I_{RB}$ clock pulse source directs a read signal into the windings 42, 44 and 46 on the cores S, $Co'$ and $Co$, respectively. The cores S, $Co$ and $Co'$ are each reset from the "1" toward the "0" state inducing a voltage in each of the windings 16, 24 and 26, respectively, with their dotted end positive. The algebraic sum of the induced voltages is effectively zero, the number of turns in the winding 16 being greater than the sum of the turns in the windings 24 and 26, permitting negligible current flow in the loop. Thus, with no input available, the circuit provides an output fulfilling the function of "Not Or."

It may be pointed out, that both the storage and coupling cores may be of square loop magnetic material and in such instances a bias current may be provided to a further winding inductively associated with each of them individually which biases the cores toward their positive threshold (write "1" direction) in speeding up the operation of the system.

In the interest of providing a complete disclosure, details of one embodiment of the "Not Or" device wherein ferrite cores are employed is given below, however, it is to be understood that other component values and current magnitudes may be employed with satisfactory operation attained so that the values given should not be considered limiting.

With the clock pulse current $I_B$ delivering a constant current of 2.0 amperes, the windings 34, 36 and 38 may comprise one turn and the winding 40 may comprise three turns. With the $I_{RA}$ and $I_{RB}$ clock pulse currents delivering a constant 1.25 amperes, the windings 28, 30, 32, 42, 44 and 46 may comprise two turns. In the coupling circuits interconnecting the storage and coupling cores, the windings 18, 20 and 22 may comprise twelve turns, the windings 24 and 26 may comprise four turns and the winding 16 may comprise ten turns, with the resistor R of 8 ohms. The input windings 10, 12 and 14 which are provided on the input coupling cores $Cx$, $Cy$ and $Cz$, respectively, may comprise four turns.

In this particular embodiment, a bias current of 0.25 ampere may be applied to a two turn winding linking each core. Each of the coupling cores and the storage core may comprise toroids of magnesium-manganese ferrite compositions having an outside diameter of 0.100 inch, inside diameter of 0.070 inch and thickness of 0.120 inch. This thickness may be obtained by stacking four cores each 0.030 inch thickness and winding the stack as a single core unit.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a binary information handling system, a "Not Or" circuit comprising a bistable magnetic storage core; control winding means on said storage core; a first, a second and a third bistable input coupling core; a first and a second bistable output coupling core; input and output winding means on each of said coupling cores; circuit means including a resistor series connecting the output winding means on each of said input coupling cores with the control winding means on said storage core and said input winding means on each of said output coupling cores; a first, second, and third clock pulse source adapted to deliver a series of pulses in sequence displaced in time; a first group of winding means on each of said input coupling cores connected with said first clock pulse so as to cause each of said input coupling cores to shift to a datum residual state when energized; a second group of winding means on each of said input coupling cores and said storage core connected with said second clock pulse source so as to cause said input coupling cores to shift to the datum residual state and said storage core to shift to an opposite residual state when energized; and a third group of winding means on each of said output coupling cores and said storage core connected with said third clock pulse source so as to cause each of said output coupling cores and said storage core to shift to the datum residual state when energized.

2. A magnetic core "Not Or" circuit comprising a magnetic storage core capable of assuming alternate stable residual magnetic states in representing binary information and having a switching threshold; control windings on said storage core; a first, a second and a third bistable input coupling core; a first and a second bistable output coupling core; input and output winding means on each of said coupling cores; circuit means connecting the output winding means on each of said input coupling cores with the control winding means on said storage core and the input winding means on each of said output coupling cores; shift winding means on each of said input coupling cores adapted to be energized simultaneously and to drive each of said input coupling cores toward a datum residual state; additional shift winding means of each of said input coupling cores and said storage core adapted to be energized simultaneously and to drive each of said input coupling cores toward the datum residual state and drive said storage core toward an opposite residual state; and shift winding means on each of said output coupling cores and said storage core adapted to be energized simultaneously and to drive each of said output coupling cores and said storage core toward the datum residual state.

3. A magnetic core "Not Or" circuit comprising a bistable magnetic storage core; control winding means on said storage core; a first, a second, and a third bistable input coupling core; a first and a second bistable output coupling core; input and output winding means on each of said coupling cores; circuit means connecting the output winding means on each of said input coupling cores with the control winding means on said storage core and the input winding means on each of said output coupling cores; shift winding means on each of said input coupling cores adapted to drive each of said input coupling cores toward a datum residual state when energized from a first clock pulse source; additional shift winding means on each of said input coupling cores and said storage core adapted to drive each of said input coupling cores toward the datum residual state and said storage core toward the opposite residual state when energized from a second clock pulse source; and shift winding means on each of said output coupling cores and said storage core adapted to drive each of said output coupling cores and said storage core toward the datum residual state when energized from a third clock pulse source.

4. A magnetic core "Not Or" circuit comprising a bistable magnetic storage core; control winding means on said storage core; a first, a second, and a third bistable input coupling core; a first and a second bistable output coupling core; input and output winding means on each of said copling cores; circuit means connecting the output winding means on each of said input coupling cores with the control windings on said storage core and the input winding means on each of said output coupling cores; shift winding means on said first input coupling core series connected with shift winding means on each of said second and third input coupling cores adapted to drive said input coupling cores toward a datum residual state when energized from a first clock pulse source; additional shift winding means on said first input coupling core series connected with shift winding means on each of said second and third input coupling cores and shift winding means on said storage core adapted to drive each of said input coupling cores toward the datum residual state and to drive said storage core toward an opposite residual state when energized from a second clock pulse source; further shift winding means on said storage core series connected with shift winding means on each of said output coupling cores adapted to drive said storage core and each of said output coupling cores toward the datum residual state when energized from a third clock pulse source; and means for biasing at least said storage core toward said opposite residual state.

5. A magnetic core "Not Or" circuit comprising a bistable magnetic storage core; control winding means on said storage core; a first, a second and a third bistable input coupling core; a first and a second bistable output coupling core; input and output winding means on each of said coupling cores; circuit means connecting the output winding means on each of said input coupling cores with the control winding means on said storage core and the input winding means on each of said output coupling cores; shift winding means on said first input coupling core series connected with shift winding means on each of said second and third input coupling cores adapted to drive each of said input coupling cores toward a datum residual state when energized by a first clock pulse source; shift winding means on said first input coupling core series connected with shift winding means on each of said second and third input coupling cores and shift winding means on said storage core adapted to drive each of said input coupling cores toward the datum residual state and said storage core toward an opposite residual state when energized by a second clock pulse source; shift winding means on said storage core series connected with shift winding means on each of said output coupling cores adapted to drive said storage core and each of said output coupling cores toward the datum residual state when energized by a third clock pulse source; and means for biasing at least said storage core toward said opposite residual state.

6. A magnetic core "Not Or" circuit comprising a magnetic storage core; a first, a second, and a third input coupling core; a first and a second output coupling core; each of said cores being formed of a magnetic material having a substantially rectangular hysteresis characteristic with a switching threshold; control winding means on said storage core; input and output winding means on each of said coupling cores; circuit means connecting the output winding means on each of said input coupling cores with the control winding means on said storage core and the input winding means on each of said output coupling cores; shift winding means on said first input coupling core series connected with shift winding means on each of said second, and third input coupling cores adapted to drive said input coupling cores toward a datum residual state when energized from a first clock pulse source; shift winding means on said first input coupling core series connected with shift winding means on each of said second and third input coupling cores and shift winding means on said storage core adapted to drive each of said input coupling cores toward the datum residual state and to drive said storage core toward an opposite residual state when energized from a second clock pulse source; shift winding means on said storage core series connected with shift winding means on each of said first and second output coupling cores adapted to drive said storage core and each of said output coupling cores toward the datum residual state when energized from a third clock pulse source; and means for biasing all of said cores toward said opposite residual state.

7. A magnetic core "Not Or" circuit comprising a magnetic storage core; a first, a second, and a third input coupling core; a first and a second output coupling core; each of said cores being formed of a magnetic material having a substantially rectangular hysteresis characteristic with a switching threshold; control winding means on said storage core; input and output winding means on each of said coupling cores; circuit means connecting the output winding means on each of said input coupling cores with the control winding means on said storage core and the input winding means on each of said output coupling cores; shift winding means on said first input coupling core series connected with shift winding means on each of second and third input coupling cores adapted to drive said input coupling cores toward a datum residual state when energized from a first clock pulse source; shift winding means on said first input coupling core series connected with shift winding means on each of said second and third input coupling cores and shift winding means on said storage core adapted to drive each of said input coupling cores toward the datum residual state and said storage core toward an opposite residual state when energized from a second clock pulse source; shift winding means on said storage core series connected with shift winding means on said first output coupling core and shift winding means on said second output coupling core adapted to drive said storage core and each of said output coupling cores toward the datum residual state when energized from a third clock pulse source; and means for energizing said shift winding means including said first, second and third clock source wherein said sources are actuated in sequence in the order named.

8. A magnetic core "Not Or" circuit comprising a magnetic storage core; a first, a second and a third input coupling core; a first and a second output coupling core; each of said cores being formed of a magnetic material having substantially rectangular hysteresis characteristic with a switching threshold; control winding means on said storage core; input and output winding means on each of said coupling cores; circuit means including a resistor series connecting the output winding means on each said input coupling cores with the control winding means on said storage core and the input winding means on each of said output coupling cores; shift winding means on said first input coupling core series connected with shift winding means on each of said second and third input coupling cores adapted to drive said first, second, and third input coupling core toward a datum residual state when energized from a first clock pulse source; shift winding means on said first input coupling core series connected with shift winding means on each of said second and third input coupling cores and shift winding means on said storage core adapted to drive each of said input coupling cores toward the datum residual state and to drive said storage core toward an opposite residual state when energized from a second clock pulse source; shift winding means on each of said output coupling cores series connected with shift winding means on said storage core adapted to drive each of said output coupling cores and said storage core toward the datum residual state when energized from a third clock pulse source; means for energizing said shift winding means including said first, second, and third clock pulse source wherein said sources are actuated in sequence in the order named; and means for biasing all of said cores toward the opposite residual state.

References Cited in the file of this patent

UNITED STATES PATENTS 2,742,632 Whitely -------------- Apr. 17, 1957